(12) United States Patent
Britton et al.

(10) Patent No.: US 8,510,431 B2
(45) Date of Patent: *Aug. 13, 2013

(54) METHOD AND APPARATUS FOR INTERNET TRAFFIC MONITORING BY THIRD PARTIES USING MONITORING IMPLEMENTS TRANSMITTED VIA PIGGYBACKING HTTP TRANSACTIONS

(75) Inventors: Zachary Edward Britton, Toulumne, CA (US); Derek Stephen Maxson, Twain Harte, CA (US); Brian Mathew Blocher, Oakdale, CA (US); Thabo Husayn Fletcher, Sonora, CA (US); Scott Kenneth Smith, Modesto, CA (US); Carlos Alberto Vazquez, Chula Vista, CA (US)

(73) Assignee: Front Porch, Inc., Sonora, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/410,273

(22) Filed: Mar. 24, 2009

(65) Prior Publication Data

US 2009/0216882 A1    Aug. 27, 2009

Related U.S. Application Data

(63) Continuation-in-part of application No. 11/974,508, filed on Oct. 12, 2007.

(60) Provisional application No. 61/146,988, filed on Jan. 23, 2009, provisional application No. 60/928,281, filed on Jul. 13, 2007.

(51) Int. Cl.
*G06F 15/173* (2006.01)

(52) U.S. Cl.
USPC ............................................. 709/224

(58) Field of Classification Search
USPC ............................................. 709/224
See application file for complete search history.

(56) References Cited

U.S. PATENT DOCUMENTS

| | | | |
|---|---|---|---|
| 5,761,673 | A | 6/1998 | Bookman et al. |
| 6,233,618 | B1 | 5/2001 | Shannon |
| 6,393,479 | B1 | 5/2002 | Glommen et al. |
| 6,438,125 | B1 | 8/2002 | Brothers |
| 7,003,565 | B2 | 2/2006 | Hind et al. |
| 7,039,699 | B1 | 5/2006 | Narin et al. |

(Continued)

FOREIGN PATENT DOCUMENTS

| | | |
|---|---|---|
| WO | 2009011728 A2 | 1/2009 |
| WO | 2010011449 A1 | 1/2010 |
| WO | 2010138213 A1 | 3/2010 |

OTHER PUBLICATIONS

International Search Report; PCT/US2008/005741; Sep. 5, 2008.

(Continued)

*Primary Examiner* — William Goodchild
(74) *Attorney, Agent, or Firm* — Robroy R. Fawcett (57) ABSTRACT

Disclosed is an internet traffic monitoring method that includes a network service provider analyzing an HTTP transaction involving an internet user client. The network service provider responds to the HTTP transaction by forwarding, to the internet user client, a modified web object including a monitoring implement. After forwarding the modified web object to the internet user client, the network service provider forwards a web object, originally associated with the HTTP transaction, to the internet user client.

45 Claims, 8 Drawing Sheets

(56) References Cited

U.S. PATENT DOCUMENTS

| | | |
|---|---|---|
| 7,260,697 B2 | 8/2007 | Okada |
| 7,509,408 B2 | 3/2009 | Kurita |
| 7,600,016 B2 | 10/2009 | Bean |
| 7,620,697 B1 | 11/2009 | Davies |
| RE41,168 E | 3/2010 | Shannon |
| 7,725,926 B1 | 5/2010 | Karp et al. |
| 7,779,103 B1 | 8/2010 | Fikes et al. |
| 2001/0032139 A1 | 10/2001 | Debonnett |
| 2001/0055274 A1 | 12/2001 | Hegge et al. |
| 2002/0116531 A1* | 8/2002 | Chu ................ 709/246 |
| 2002/0120666 A1* | 8/2002 | Landsman et al. ........ 709/200 |
| 2002/0128925 A1 | 9/2002 | Angeles |
| 2002/0138331 A1 | 9/2002 | Hosea et al. |
| 2002/0184364 A1 | 12/2002 | Brebner |
| 2003/0050863 A1* | 3/2003 | Radwin .................... 705/27 |
| 2003/0115546 A1 | 6/2003 | Dubey et al. |
| 2003/0182583 A1 | 9/2003 | Turco |
| 2004/0015600 A1 | 1/2004 | Tiwary et al. |
| 2004/0073533 A1 | 4/2004 | Mynarski et al. |
| 2004/0122943 A1* | 6/2004 | Error et al. ............. 709/224 |
| 2005/0015429 A1 | 1/2005 | Ashley et al. |
| 2005/0033641 A1 | 2/2005 | Jha et al. |
| 2005/0144073 A1 | 6/2005 | Morrisroe et al. |
| 2005/0216421 A1 | 9/2005 | Barry et al. |
| 2005/0216844 A1 | 9/2005 | Error et al. |
| 2005/0238000 A1 | 10/2005 | Pollock et al. |
| 2005/0257250 A1 | 11/2005 | Mitchell et al. |
| 2006/0136372 A1* | 6/2006 | Schunemann ............... 707/2 |
| 2006/0136524 A1 | 6/2006 | Wohlers et al. |
| 2006/0174327 A1 | 8/2006 | Song et al. |
| 2006/0288096 A1 | 12/2006 | Yim |
| 2007/0143829 A1 | 6/2007 | Hinton et al. |
| 2007/0204223 A1 | 8/2007 | Bartels et al. |
| 2007/0245137 A1 | 10/2007 | Bhagat et al. |
| 2008/0004958 A1 | 1/2008 | Ralph et al. |
| 2008/0005782 A1 | 1/2008 | Aziz |
| 2008/0040224 A1 | 2/2008 | Roker |
| 2008/0052392 A1* | 2/2008 | Webster et al. ............. 709/224 |
| 2008/0101225 A1 | 5/2008 | Tassinari et al. |
| 2008/0126446 A1 | 5/2008 | Brunet et al. |
| 2008/0126567 A1 | 5/2008 | Wilson |
| 2008/0201331 A1 | 8/2008 | Eriksen et al. |
| 2008/0222283 A1 | 9/2008 | Ertugrul et al. |
| 2009/0019148 A1 | 1/2009 | Britton et al. |
| 2009/0030774 A1 | 1/2009 | Rothschild et al. |
| 2009/0037579 A1 | 2/2009 | Error et al. |
| 2009/0077163 A1 | 3/2009 | Ertugrul et al. |
| 2009/0080421 A1 | 3/2009 | Ou |
| 2009/0099931 A1 | 4/2009 | Aaltonen et al. |
| 2009/0113532 A1 | 4/2009 | Lapidous |
| 2009/0157875 A1 | 6/2009 | Britton et al. |
| 2009/0177771 A1 | 7/2009 | Britton et al. |
| 2009/0254971 A1 | 10/2009 | Herz et al. |
| 2009/0293018 A1 | 11/2009 | Wilson et al. |
| 2010/0024032 A1 | 1/2010 | Britton et al. |
| 2010/0306052 A1 | 12/2010 | Britton et al. |

OTHER PUBLICATIONS

Written Opinion of International Search Report; PCT/US2008/005741; Sep. 5, 2008.
International Search Report; PCT/US2010/020670; Mar. 9, 2010.
Written Opinion of International Search Report; PCT/US2010/020670; Mar. 9, 2010.
Written Opinion of International Search Report; PCT/US2009/047709; Jul. 31, 2009.
Supplementary European Search Report, Application No. EP 08767549.2 (PCT/US2008/005741), Dec. 6, 2011, 7 pages, European Patent Office, Munich, Germany.

* cited by examiner

| User | Participate in Tracking? | Location | Attribute |
|---|---|---|---|
| Juan Smith | Yes | Los Angeles, CA | Wifi |
| Sally Rodriguez | No | New York, NY | |
| 12.123.25.25 | No | Sacramento, CA | |
| 00-13-AA-BB-CC | Yes | | |
| 000130-26-58396-3268 | Yes | | |
| Jen Perla | Yes | Miami, FL | Wifi |

| Web Page | Eligible for Insertion? |
|---|---|
| www.yahoo.com | Yes |
| www.espn.com | No |
| *.edu | No |
| www.whitehouse.gov | Yes |

| Web Bug Location |
|---|
| www.adserver1.com/webbug |
| www.adserver2.com/webbug |
| www.adserverN.com/webbug |
| www.itm1.com/webbug |
| www.itm2.com/webbug |
| www.itm3.com/webbug |

<script src="http://www.goodle-analytics.com/urchin.js" type="text/javascript"></script>

⊞ HTTP/1.1 200 OK\r\n
Cache-Control: max-age=604800, public\r\n
Content-type: text/javascript\r\n
Last-Modified: Tue, 17 Jun 2008 17:20:41 GMT\r\n
Date: Thu, 11 Sep 2008 15:34:50 GMT\r\n
Content-Length: 6846
\r\n

620

☐ Line-based text data: text/javascript
//-- Goodle Analytics Urchin Module\n
//-- Copyright 2007 Goodle, All Rights Reserved.\n
\n
//-- Urchin On Demand Settings ONLY\n
. . .
. . .
. . .

<script src="http://www.goodle-analytics.com/urchin.js" type="text/javascript"></script>

⊞ HTTP/1.1 200 OK\r\n
　Cache-Control: max-age=604800, public\r\n
　Content-type: text/javascript\r\n
　Last-Modified: Tue, 17 Jun 2008 17:20:41 GMT\r\n
　Date: Thu, 11 Sep 2008 15:34:50 GMT\r\n
　Content-Length: 6846
　\r\n
□ Line-based text data: text/javascript

720

```
var y='http://www.goodle-analytics.com/urchin.js';
var z='http://www.exampleadserver.com/monitoring-implement.js';
document.write('<script src="'+z+'"></script>');
document.write('<script src="'+y+'"></script>');
```

METHOD AND APPARATUS FOR INTERNET TRAFFIC MONITORING BY THIRD PARTIES USING MONITORING IMPLEMENTS TRANSMITTED VIA PIGGYBACKING HTTP TRANSACTIONS

CROSS-REFERENCE TO RELATED APPLICATIONS

This application claims the benefit of U.S. Provisional Application No. 61/146,988, filed Jan. 23, 2009, and this application is a continuation-in-part of U.S. application Ser. No. 11/974,508, filed Oct. 12, 2007, which claims the benefit of U.S. Provisional Application No. 60/928,281, having an assigned filing date of Jul. 13, 2007. These three related applications are incorporated herein by reference.

BACKGROUND OF THE INVENTION

1. Field of the Invention

The present invention relates to Internet traffic monitoring, and more particularly, to a method for using monitoring implements to encompass a wide range of internet traffic.

2. Description of the Prior Art and Related Information

Many Web sites are financially supported by online advertising. Some Web sites sell their own advertisements (ads) and many use, for at least a portion of their advertising inventory, third party ad sales companies known commonly as Advertising Networks (AN). For ease of reference, both types (those who sell their own ads and those who use third party ad sales companies) will be referred herein as ANs. The profitability of many Web sites is chiefly driven by the success, or failure, of the AN at selling the Web sites' ad inventory at the highest possible rate.

Run of Network (RON) advertisements are served indiscriminately to all Internet users who visit Web sites. These RON advertisements tend to earn much lower revenues per ad shown than their more targeted counterparts. This targeting can include location, user interests and other profile data.

To increase the value of the ad inventory, ANs generally use Web bugs and Cookies to track individual users and make it possible to target individual ads. A Web bug may be a small (typically 1×1 pixel) transparent GIF image (or other image of the same color as the background) that is embedded in an HTML page, such as a Web page. When a Web page is opened, the Web bug image is downloaded from the server storing it, allowing for monitoring of the Web page's viewing or usage. A Web bug may also use HTML, iframe, style, script, input link, embed, object or other tags to track usage.

When an Internet user navigates to a Web page that has advertisement inventory under AN management, the AN serves a Web bug. While a Web bug on an individual page has limited utility, ANs that have relationships with large numbers of Web sites can serve their Web bugs on many Web sites. By cross-referencing the traffic from multiple Web sites, the AN can begin profiling the Internet user and provide higher value advertising that is more highly targeted to the individual Internet user's interest. Therefore, a primary concern or goal for many AN is to increase the distribution of their Web bug to as many sites as possible.

Further investigation showed that ANs have largely been left out of the value cycle created by search engines. Search engines are able to derive important profile information from their users' Internet searches. They then monetize this profile information by showing ads that match this profile. For example, someone searching for a hybrid automobile on a search engine could see ads for Toyota Prius® vehicles instead of a relatively low-value RON advertisement. Without the ability to place their Web bug on major search engine sites, AN are unable to tap this valuable profile information.

Finally, the Network Service Providers (NSP), such as ISPs, corporations, educational institutions, municipal wireless networks, etc., are not able to monetize their users' valuable profile information. While they may know the location of their users, they are unable to easily provide this information to ANs. Moreover, many NSPs do not profile their users' traffic and thus are not able to provide this information to ANs.

Attempts to bridge the gap between ANs and NSPs have typically fallen into two categories: 1) Swapping out RON ads with more targeted ads, or 2) modifying Web requests made to ANs to include additional profile information that will enable the AN to serve more targeted advertisements. Both approaches require the use of a device, such as a proxy server, or its equivalent, to modify the HTTP request to enable the switching of the original Web requests to ANs. Moreover, both approaches require some sort of monitoring of the NSP's user traffic. Two major problems of these approaches are that they require extensive NSP monitoring and, perhaps even more difficult, require detailed technical interaction between NSPs and ANs.

Internet Traffic Measurement (ITM) companies face a different challenge. Companies such as Nielsen Net Ratings have client-side monitoring software installed on thousands of computers so that they can derive statistics that can be applied to the Internet populace in general in order to understand global trends. Other ITM companies have devices installed at central points on the Internet in order to gather data for the development of trend information. Such solutions use the data to find broad trends rather than individual behavioral data about Internet users and thus are unable to provide specific criteria for the placement of targeted content and advertising. Other ITM companies have other approaches, but use relatively small samples to represent the much larger Internet population.

Transmission of the monitoring implements requires a flexible format that does not obstruct the user's access to the Internet content requested. Methods that include modification of cookies to include new criteria or modification of the original web page may have undesirable consequences. Additionally, modification of an HTML-based web page can result in unintended consequences such as failure of the page to load correctly or excessive delay in loading the page. It is desirable that services which insert AN and ITM web bugs also provide transparency to the end user.

There is, therefore, a need for a method and apparatus which enables ANs or ITM companies to more easily monitor Web traffic generated by users surfing on the Internet via NSPs and to effectively communicate this data to the ANs. The present invention provides the methods and apparatuses to meet these needs.

SUMMARY OF THE INVENTION

The present invention may be embodied in an internet traffic monitoring method that includes a network service provider analyzing an HTTP transaction involving an internet user client. The network service provider responds to the HTTP transaction by forwarding, to the internet user client, a modified web object including a request monitoring implement. After forwarding the modified web object to the internet user client, the network service provider forwards a web object, originally associated with the HTTP transaction, to the internet user client.

In more detailed features of the invention, the HTTP transaction may involve a web content request that may include search terms directed to an internet search engine, and the monitoring implement may cause the internet user client to forward the search terms to an associated advertisement selection service. Further, the modified web object may include at least two monitoring implements which each may be associated with a separate advertisement selection service. The monitoring implements may include at least first and second web bugs (or at least first and second cookies). Each web bug may be referenced with a URL having embedded parameters related to the user associated with the internet user client.

In other more detailed features of the invention, an advertisement selection service may select targeted advertising web content for presentation by the internet user client based on at least one parameter from a monitoring implement of the network service provider, and based on at least one parameter from a monitoring implement of another network service provider.

The present invention also may be embodied in an internet traffic monitoring system for a network service provider. The system may have means for performing the method steps. Alternatively, the present invention may be embodied in computer program product having computer readable medium including code for causing a computer to perform the method steps.

Additionally, the present invention may be embodied in an internet traffic monitoring method that includes a network service provider analyzing an embedded web object request from an internet user client. The network service provider intercepts the requested web object, and customizes the requested embedded web object. The customized web object includes the requested embedded web object which has been modified by the network service provider to include a monitoring implement. The network service provider forwards the customized web object to the internet user client.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which.

DETAILED DESCRIPTION

To address the shortcomings of the prior art, the present invention provides a new method for Advertising Networks (AN) and Internet Traffic Measurement (ITM) companies to receive user web traffic data from Network Service Providers (NSPs). Web bugs may be used by ANs and ITM companies to track the Web traffic activity of all the users from given NSPs rather than just small subsets. Many ANs use a series of channels and each web bug is the indicator that one or more criteria used in targeting advertising has been observed. Therefore, an advantageous function of the internet traffic monitoring technique of the present invention may be to convert raw behavior into a series of single web bug transactions easily utilized by ANs.

The present invention enables NSPs to create and insert and/or modify web objects with AN and ITM Web bugs into their users' Web surfing sessions. The invention is placed on the NSP's network so that it can intercept an HTTP transaction, such as a Web page request, made by a user and either replace it with a customized Web page that includes Web bugs from participating AN and ITM companies, or modify the content of the web request to insert the necessary Web bugs from the participating AN and ITM companies. These modifications or replacements may be made to any objects including HTML, javascript, flash, images, audio, video or other media that are commonly served using the HTTP protocol. The originally requested Web object is then shown. In its simplest form, the customized Web object only provides the Web bugs with URL data from the originally requested Web page. In a more complex installation, it also modifies the URL, cookie, post, or query string, to include location and other information that the NSP knows about the user. In all cases, the inserted Web object is transparent to the user. The HTTP transaction may be intercepted during the request or response for the best effect.

The invention enables a NSP to elect to have only a portion of its users eligible for Web bug insertion. The NSP could, for example, opt to have only users accessing the Internet for free or at a discounted price be eligible for the Web bug insertion. The user database would then be updated per the grouping selected by the NSP.

After a user makes a Web object request, and the database shows that the user is eligible for Web bug insertion, then a database is referenced to ascertain whether the requested web object is eligible for Web bugs. By only inserting Web bugs on certain object, the NSP can minimize any induced latency caused by the insertion process. For example, a NSP could opt to only serve customized Web pages with Web bugs when the originally requested Web object was for a search engine.

If the user is eligible and the Web object is eligible, then the invention references the user database again to see if location data or other user attributes are known. If they are, then the customized Web page URL appends these parameters to the URL or other element in the HTTP transaction in order to transmit the information to the ANs and ITM companies via their respective Web bugs.

The inserted Web page then forwards the user to the originally requested Web object. The inserted object is invisible to the user and should only induce nominal latency before the originally requested page is shown. The process will repeat itself for each Web object request that the user makes.

Also note that other companies could utilize their Web bugs in much the same fashion as the ANs and ITM companies. For example, media companies could use Web bugs to determine what content would be of most interest to surfers who visit their Web sites.

The present invention relates generally to creating and inserting a web object with web bugs into the stream of web objects viewed by web users so that ANs and other third parties can extend the use and utility of their traffic monitoring tools to encompass a much wider range of web traffic.

Figure 1:
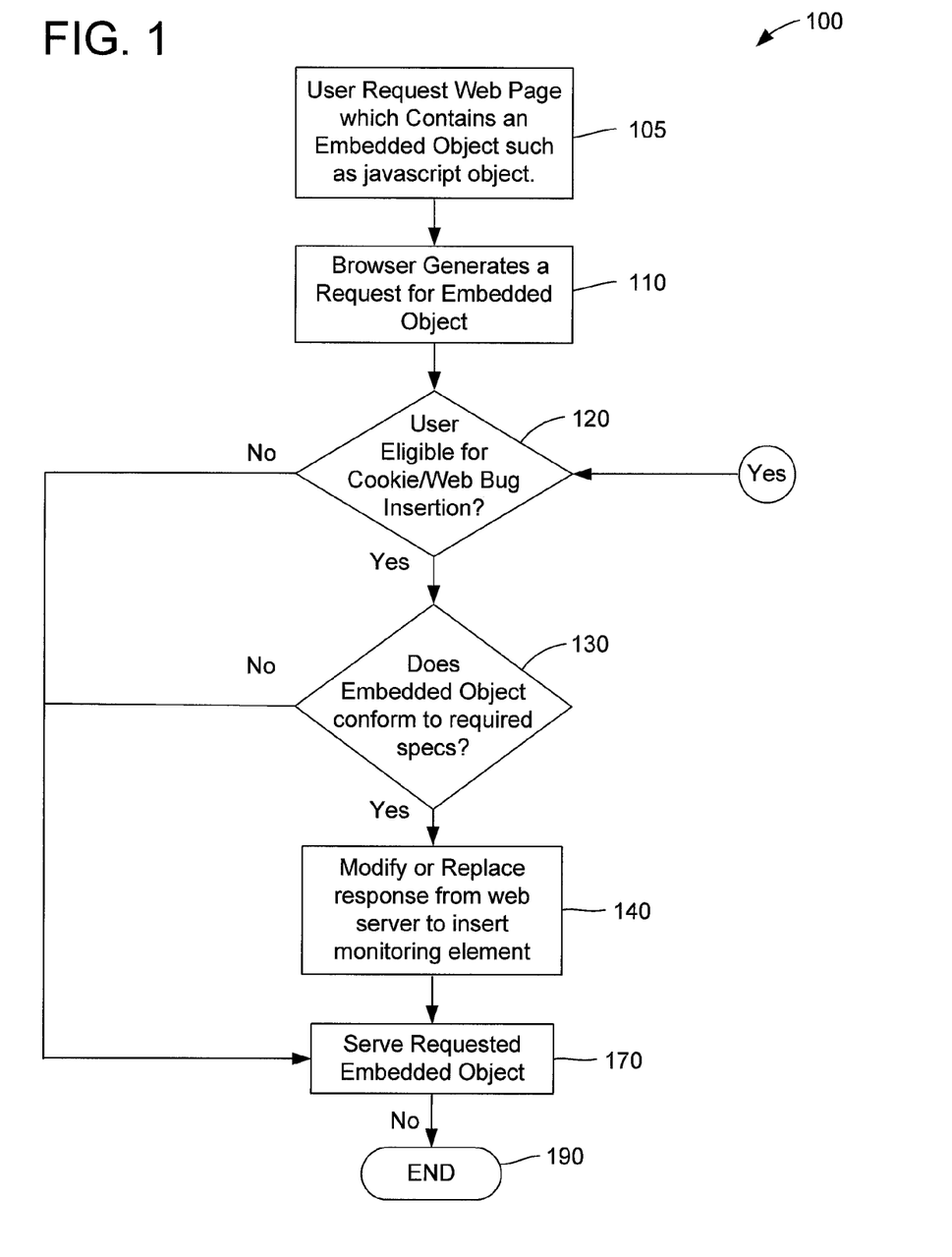
FIG. 1 depicts a flowchart illustrating the process of inserting web bugs or other tracking tools, in accordance with the present invention.

FIG. 1 depicts a flowchart illustrating the process 100 of inserting Web bugs or other tracking tools, in accordance with the present invention. In describing FIG. 1, it is assumed that: 1) The Internet user is connected to the Internet through an NSP (as shown in FIG. 2) that utilizes the invention; and 2) One or more AN servers, ITM servers, or other servers utilizing web bugs or other tracking tools (as shown in FIG. 2, 240.1-241) are participating.

Figure 2:
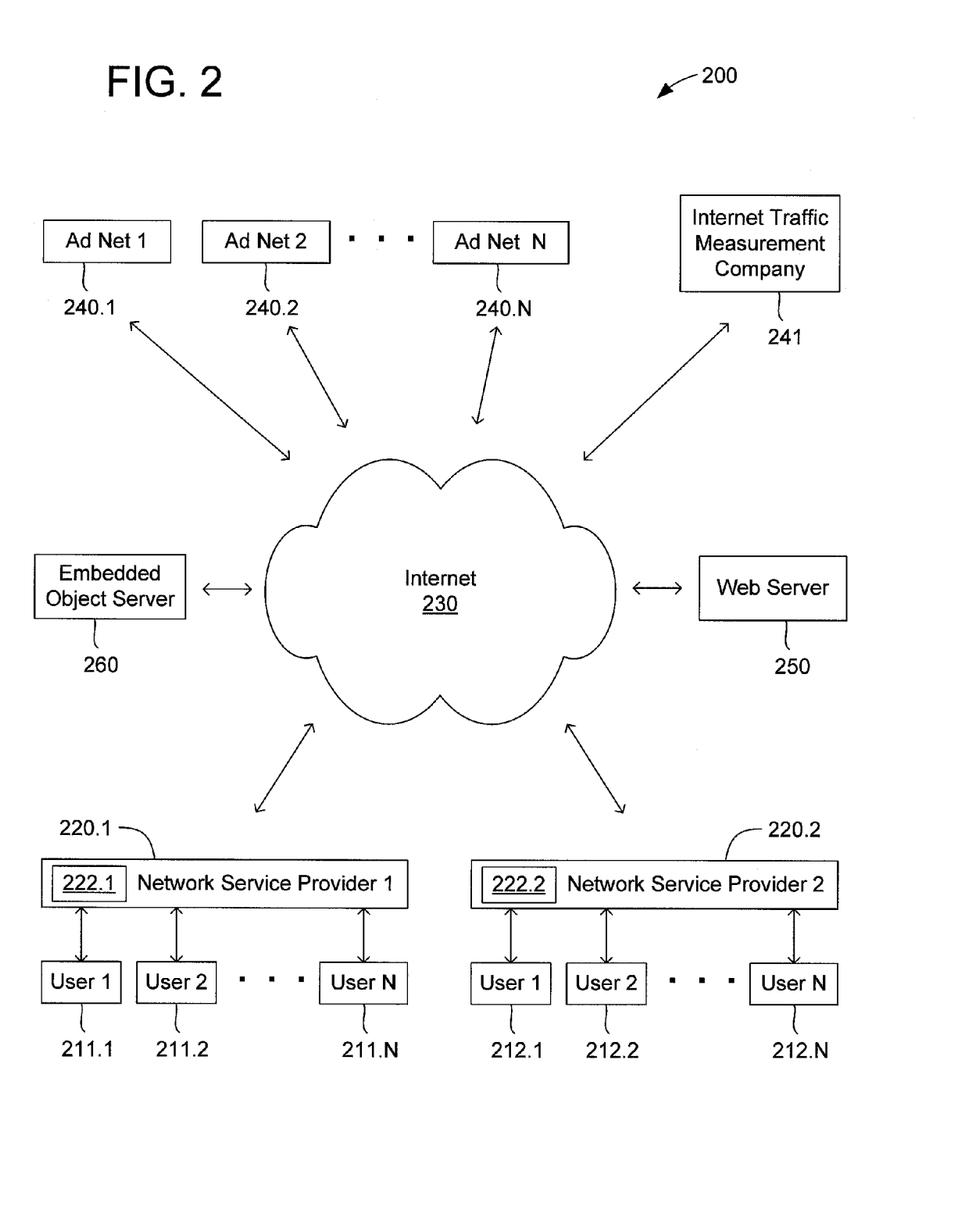
FIG. 2 depicts an exemplary network system, in which the present invention can function.

In FIG. 1 the Internet user (which can be any one of the users shown in FIG. 2, 211.1 212.N) first establishes an Internet connection through a Network Service Provider (as shown in FIG. 2, 220.1 and 220.2). At step 105, the Internet user's browser (which is used on any one of the users clients 211.1-212.N) requests a web page from a web server 250 which contains an embedded object (FIG. 6, 610) such as a JavaScript request. At step 110, the browser receives the requested web page and generates a request for the object embedded in the requested web page.

Figure 3:
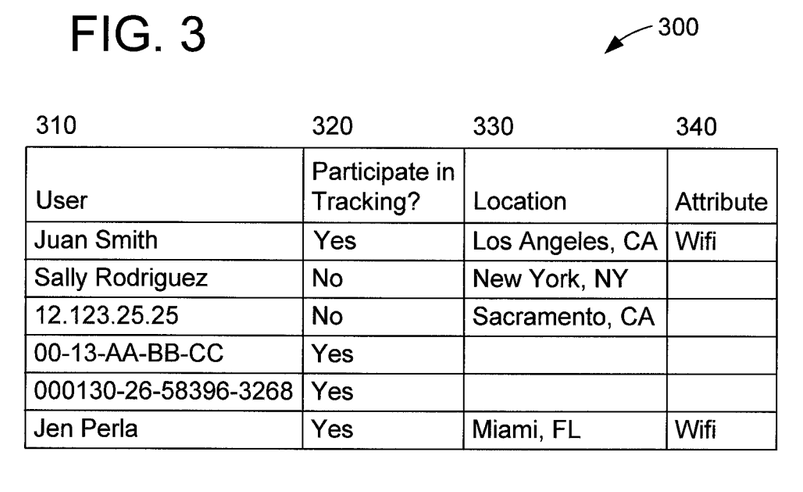
FIG. 3 depicts an exemplary user database for the present invention.

At step 120, the application checks fields 310 and 320 in database 300, shown in FIG. 3, to see if the user is participating in the tracking. If the user is not participating, the user goes to step 170, and is served the originally requested embedded Web object. If the user is participating in Web bug insertion, then the user is moved to step 130. Note that steps 120, 130 and 140 can be conducted in alternative order. Also note that a simplified version of the invention can skip any of the steps 120-140 and simply serve modified scripts with any available location parameters to all users on all pages.

Figure 4:
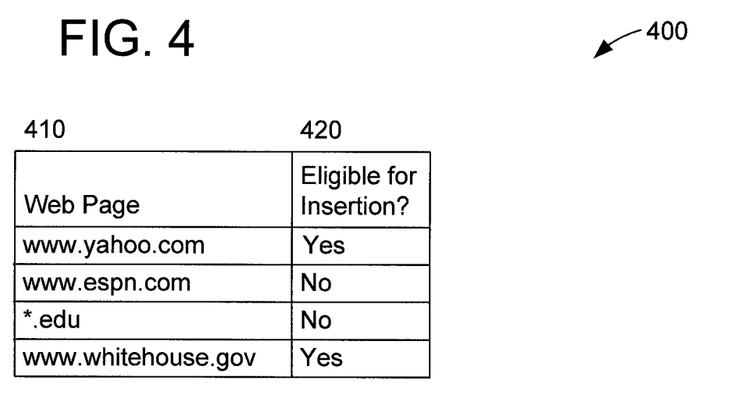
FIG. 4 depicts an exemplary Web page database for the present invention.

At step 130, the application evaluates the embedded object by checking fields 410 and 420 in database 400 to ascertain if the embedded Web object requested in step 110 is a participating Web location. If the object is eligible and meets all requirements prior to modification, the user is moved to step 140. If it is not, the user is moved to step 170 and is served the originally requested Web object from step 110.

At step 140, the application inserts or modifies a Web object from an embedded web object server 260 with Web bugs from participating ANs and ITM companies (FIG. 2, 240.1-241). The Web bugs may be modified to include the known location parameter found in FIG. 3, field 330. The user client is then moved to step 170.

At step 170, the embedded Web object originally requested by the user in step 110 is served. If the user client's browser requests another embedded Web object, the user may be sent to step 120. If the user does not request another Web object, the session ends (step 190). At step 190, the user client's browser is no longer requesting embedded Web objects and there is no more interaction.

FIG. 2 depicts a block diagram illustrating an exemplary network 200, which includes one or more Internet users connected to the Internet via NSPs. The web site traffic of these users is monitored by one or more ANs and one or more ITM companies via the present invention.

As shown in FIG. 2, the network 200 includes user clients 211.1-212.N, one or more NSPs 220.1-220.2, the Internet 230, and one or more ANs and ITM companies 240.1-241. The Internet 230 can connect a user client to a myriad of web servers 250 and embedded web object servers 260. An embedded web object server 260 may be a subset of a web server 260, or it may be an entirely separate server.

FIG. 3 depicts an exemplary user database 300 located at an NSP (or, alternatively, it can be located off-site on a separate network) (which can be any one of the NSPs 220.1-220.2) for storing user identification and participation information, in accordance with the present invention. Use of this database is optional, as noted in the description of FIG. 1.

The participant database 300 (which runs on a computer system as shown in FIG. 2) has four fields: 1) a Subscriber or User field, 310, containing the username (some NSPs could use this field for the user's IP address, Media Access Control—MAC address, or Global Unique Identifier—GUID, instead of a username); 2) a Participation field, 320, detailing whether the user is participating in the tracking; 3) a Location field, 330 containing the subscriber's location; and 4) an Attribute field, 340, that provides other known user information. The example shown in FIG. 3 uses the Attribute field to inform ANs and ITM companies (FIG. 2 240.1-241) that the User (FIG. 2, 211.1-212.N) is using WiFi to connect to the Internet. Many attribute fields could be used, or none at all, depending upon the implementation of the invention.

FIG. 4 depicts an exemplary Web page database 400 located at an NSP (or, alternatively, it can be located off-site on a separate network) (which can be any one of the NSPs 220.1-220.2) for storing Web site participation information, in accordance with the present invention. Use of this database is optional, as noted in the description of FIG. 1.

The Web page database 400 (which runs on a computer system as shown in FIG. 2) has two fields: 1) a Web Page field, 410, containing the Web object's URL or partial URL; and 2) an Eligibility field, 420, detailing whether the web page is eligible for insert.

Figure 5:
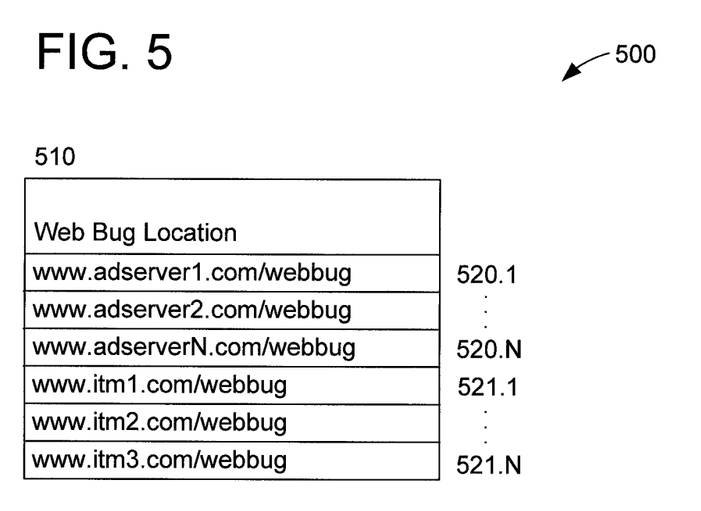
FIG. 5 depicts an exemplary Web bug database.

FIG. 5 depicts an exemplary user database 500 located at an NSP (or, alternatively, it can be located off-site on a separate network) (which can be any one of the NSPs 220.1-220.2) for storing the Web bug URL location information for participating ANs and ITM companies, in accordance with the present invention. The Web bug location database 500 (which runs on a computer system) has one field: 1) a Web Bug Location field, 510, containing the URL of the Web bug.

Figure 6:
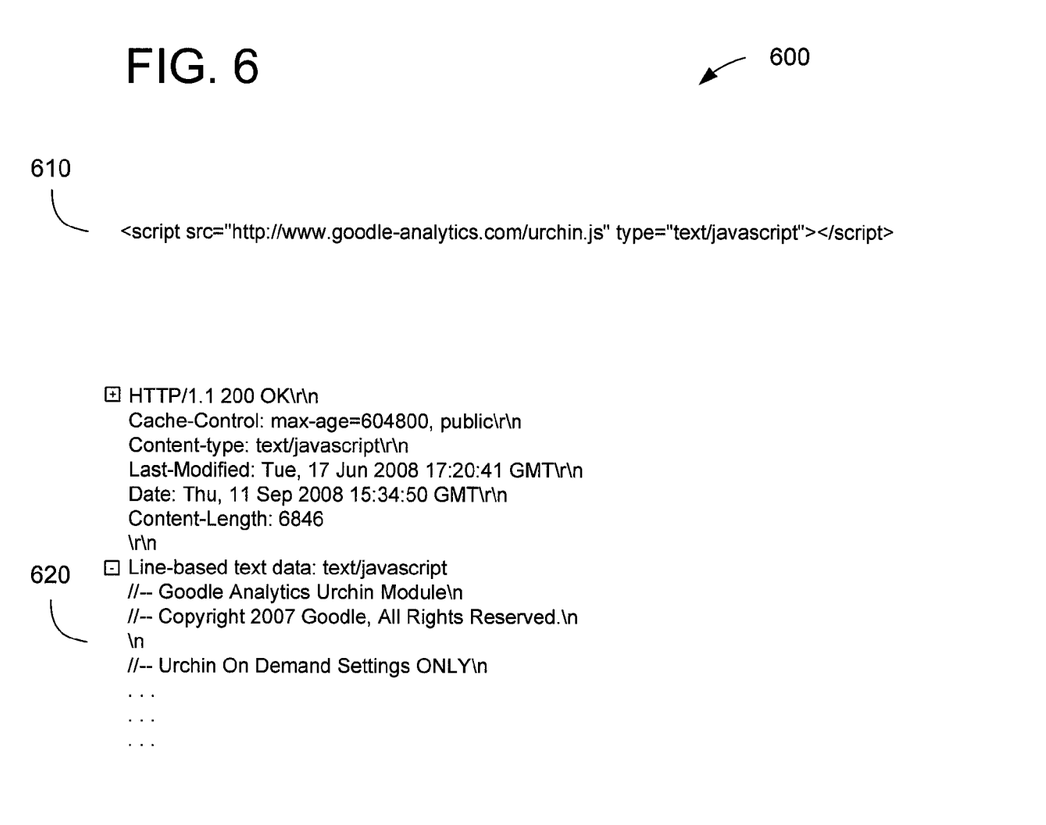
FIG. 6 depicts an exemplary HTTP transaction without modifications.

FIG. 6 depicts an exemplary HTTP transaction without modifications 600 wherein a web browser executed the HTML for making a request to a web server for a JavaScript object 610. The web server returns an HTTP response containing JavaScript code 620 in order to execute the desired operation for the embedded object.

Figure 7:
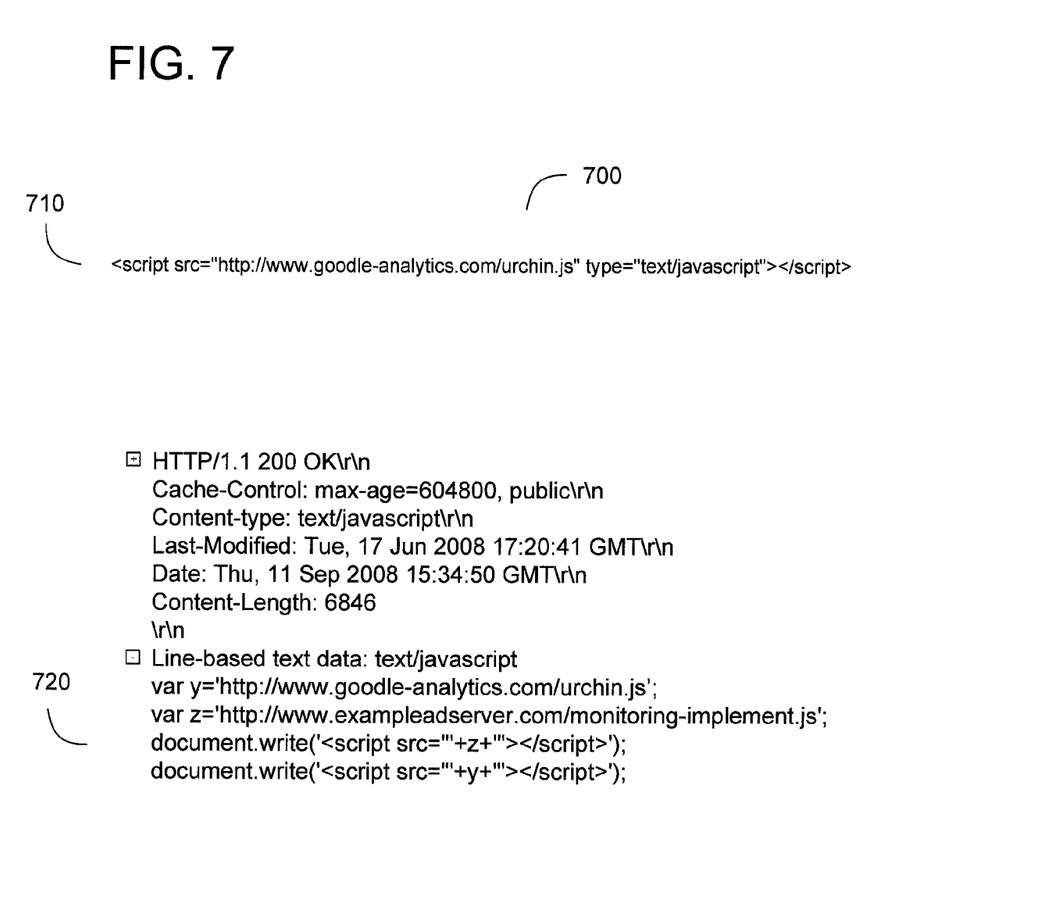
FIG. 7 depicts an exemplary HTTP transaction with modifications according to the present invention

FIG. 7 depicts an exemplary HTTP transaction with modifications according to the present invention 700 for inserting Web bugs by modifying the embedded object's response. A web request 710 is sent to the web server. The response from the web server 250 is modified or replaced with a new response 720 which is able to execute the Web Bugs and the original web object.

Figure 8:
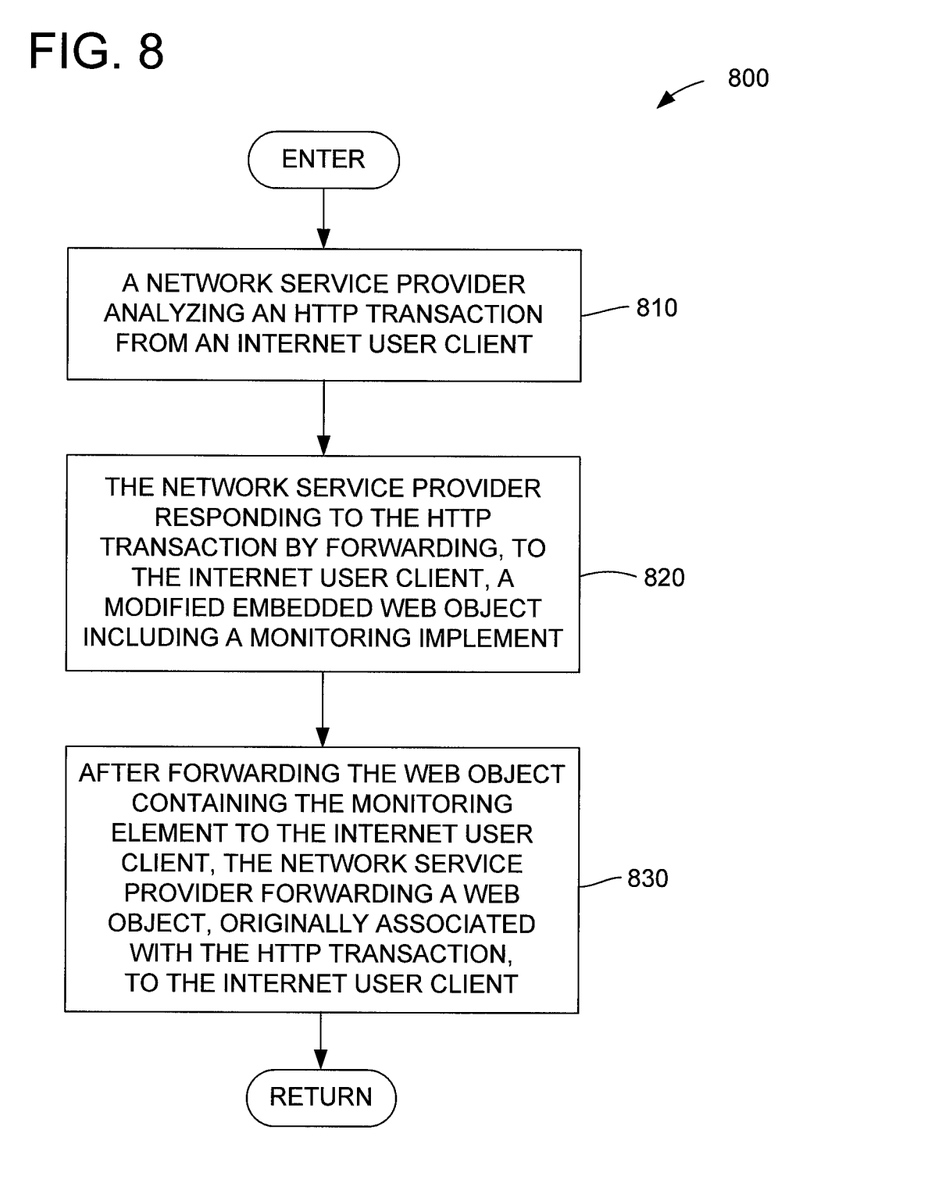
FIG. 8 depicts a flowchart illustrating an embodiment of an internet traffic monitoring method, according to the present invention.

A specific embodiment of the present invention, shown in FIG. 8, may be embodied in an internet traffic monitoring method 800 including an NSP 220.1-220.2 analyzing a an HTTP transaction, such as a web content request, involving an internet user client 211.1-212.N (step 810), such as a computer having a web browser. The NSP responds to the HTTP transaction by forwarding, to the internet user client, a modified embedded web object 720 including at least one monitoring implement, 520.1-520.N and 521.1-521.N (step 820). At least two monitoring implements may be each associated with a separate advertisement selection service 240.1-240.N and/or 241. After forwarding the modified web object to the internet user client, the NSP forwards the web object, originally associated with the HTTP transaction, to the internet user client (step 830).

A web content request may include search terms directed to an internet search engine, and the monitoring implement may cause the internet user client to forward the search terms to an associated advertisement selection service. The search terms may be used to derive a profile of a user associated with the internet user client. Further, a first monitoring implement may include a first web bug and/or cookie associated with a first advertisement selection service, and a second monitoring implement may include a second web bug and/or cookie associated with a second advertisement selection service. Each web bug may be referenced with a URL having embedded parameters related to the user associated with the internet user client.

An advertisement selection service may select targeted advertising web content for presentation by the internet user client based on at least one parameter, 330 and 340, from a monitoring implement of the NSP 220.1, and based on at least one parameter from a monitoring implement of another NSP 220.2.

Figure 9:
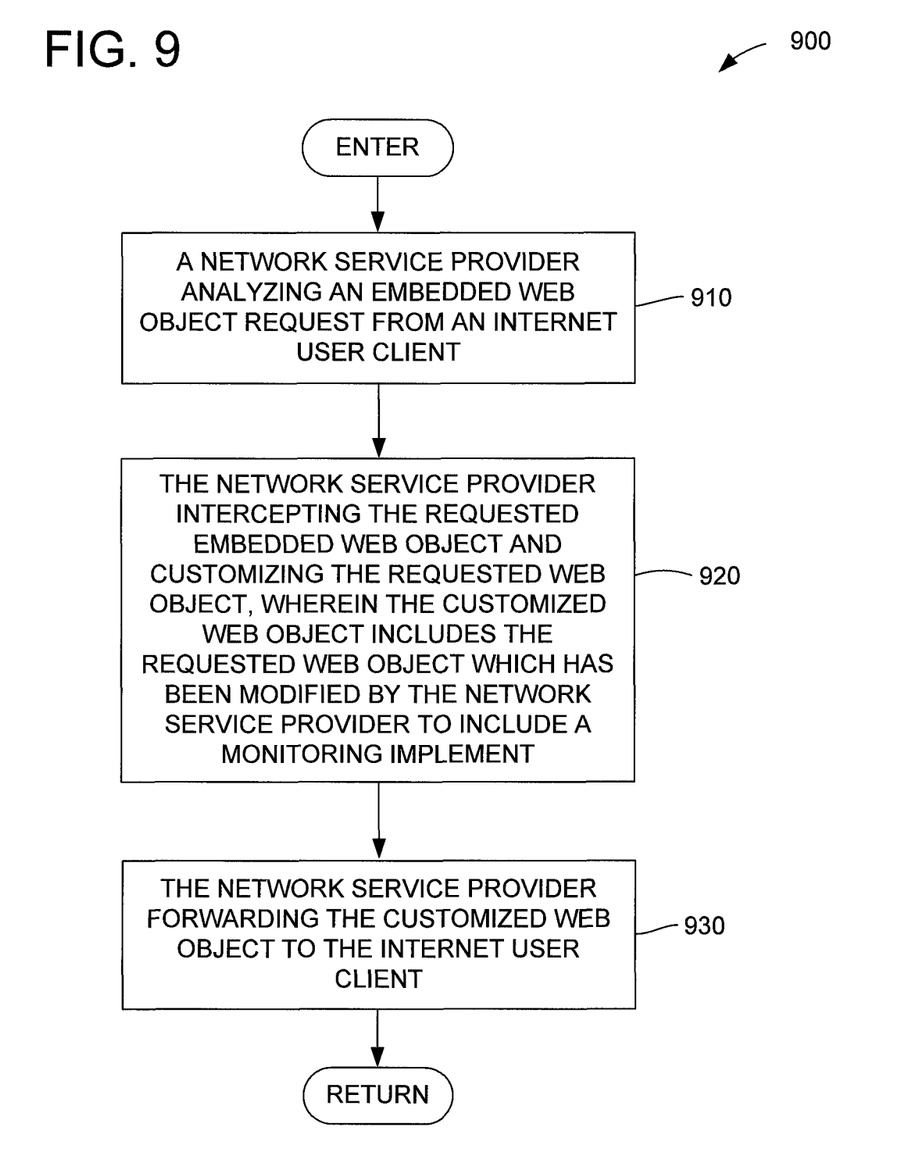
FIG. 9 depicts a flowchart illustrating another embodiment of an internet traffic monitoring method, according to the present invention.

Another specific embodiment of the present invention may be embodied in an internet traffic monitoring method 900, shown in FIG. 9, that includes an NSP 220.1-220.2 analyzing an embedded web object request from an internet user client 211.1-212.N (step 910). The NSP intercepts the requested web object, and customizes the requested embedded web object (step 920). The customized web object includes the requested embedded web object which has been modified by the network service provider to include at least one web content request monitoring implement, 520.1-520.N and 521.1-521.N. The NSP then forwards the customized web object to the internet user client (step 930).

The present invention enables a NSP to send user information to participating ANs and ITM companies. This is done by modifying or replacing an embedded web object with a new object containing web bugs from participating ANs and ITM companies before showing the originally requested object. Web bugs on the inserted object capture URL information for the AN who then subsequently can tailor the advertisements they serve to users' interest as shown by the web pages they select and the searches they make. ITM companies could use the invention in a similar fashion to track user web traffic. Common industry practice for web servers is to place their web bugs on many web sites, but with this invention, they can track user web traffic even on sites that don't have the AN's cookies already embedded on the web pages.

The present invention also may be embodied in an internet traffic monitoring system for an NSP. The system may have means, such as a computer, for performing the method steps. Alternatively, the present invention may be embodied in computer program product having computer readable medium 222.1-222.2 including code for causing a computer to perform the method steps.

The embedded web objects may be JavaScript, images, Flash or similar HTTP objects that may be intercepted and modified for the purpose of the transmission of monitoring implements. The embedded object's http transaction is modified in order to add the monitoring implement.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. An internet traffic monitoring method, comprising:
a network service provider analyzing an HTTP transaction involving an internet user client and web content from the internet, wherein the internet user client has a connection to the internet through the network service provider;
the network service provider responding to the HTTP transaction by forwarding, to the internet user client, a modified web object including at least a first monitoring implement associated with a first advertisement selection service for causing the internet user client to forward at least one user parameter to the first advertisement selection service and including at least a second monitoring implement associated with a second advertisement selection service for causing the internet user client to forward at least one user parameter to the second advertisement selection service; and
after forwarding the modified web object to the internet user client, the network service provider forwarding an embedded web object, originally associated with the HTTP transaction, to the internet user client;
wherein the first advertisement selection service selects targeted advertising web content for presentation to the internet user client based on the at least one user parameter forwarded based on the first monitoring implement included in the modified web object forwarded by the network service provider, and based on at least one user parameter from a monitoring implement included in a modified web object forwarded by another network service provider in response to a separate HTTP transaction.

2. An internet traffic monitoring method as defined in claim 1, wherein the HTTP transaction involves a web content request that includes search terms directed to an internet search engine, and wherein each monitoring implement causes the internet user client to forward the search terms to each respective advertisement selection service.

3. An internet traffic monitoring method as defined in claim 1, wherein the first and second monitoring implements comprise at least first and second web bugs.

4. An internet traffic monitoring method as defined in claim 3, wherein the first web bug is referenced with a URL having embedded parameters related to the user associated with the internet user client.

5. An internet traffic monitoring method as defined in claim 1, wherein the first and second monitoring implements comprise at least first and second cookies.

6. An internet traffic monitoring method as defined in claim 1, wherein the first monitoring implement comprises a web bug associated with the first advertisement selection service, and the second monitoring implement comprises a cookie associated with the second advertisement selection service.

7. An internet traffic monitoring method as defined in claim 1, wherein the first advertisement selection service is separate from the second advertisement selection service.

8. A network service provider having an internet traffic monitoring system, comprising: computer means for analyzing an HTTP transaction involving an internet user client and web content from the internet, wherein the internet user client has a connection to the internet through a network service provider; computer means for responding to the HTTP transaction by forwarding, to the internet user client, a modified web object including at least a first monitoring implement associated with a first advertisement selection service for causing the internet user client to forward at least one user parameter to the first advertisement selection service and including at least a second monitoring implement associated with a second advertisement selection service for causing the internet user client to forward at least one user parameter to the second advertisement selection service; and computer means for forwarding an embedded web object, originally associated with the HTTP transaction, to the internet user client after forwarding the modified embedded web object; wherein the first advertisement selection service selects targeted advertising web content for presentation to the internet user client based on the at least one user parameter forwarded based on the first monitoring implement included in the modified web object forwarded by the network service provider, and based on at least one user parameter from a monitoring implement included in a modified web object forwarded by another network service provider in response to a separate HTTP transaction.

9. A network service provider as defined in claim 8, wherein the first advertisement selection service is separate from the second advertisement selection service.

10. A network service provider as defined in claim 8, wherein the HTTP transaction involves a web content request that includes search terms directed to an internet search engine, and wherein each monitoring implement causes the internet user client to forward the search terms to each respective advertisement selection service.

11. A network service provider as defined in claim 8, wherein the first and second monitoring implements comprise at least first and second web bugs.

12. A network service provider as defined in claim 11, wherein the first web bug is referenced with a URL having embedded parameters related to the user associated with the internet user client.

13. A network service provider as defined in claim 8, wherein the first and second monitoring implements comprise at least first and second cookies.

14. A network service provider as defined in claim 8, wherein the first monitoring implement comprises a web bug associated with the first advertisement selection service, and the second monitoring implement comprises a cookie associated with the second advertisement selection service.

15. A computer program product, comprising: non-transitory computer readable medium including: code for causing a computer to analyze an HTTP transaction involving an internet user client and web content from the internet, wherein the internet user client has a connection to the internet through a network service provider; code for causing a computer to respond to the HTTP transaction by forwarding, to the internet user client, a modified web object including at least a first monitoring implement associated with a first advertisement selection service for causing the internet user client to forward at least one user parameter to the first advertisement selection service and including at least a second monitoring implement associated with a second advertisement selection service for causing the internet user client to forward at least one user parameter to the second advertisement selection service; and code for causing a computer to forward an embedded web object, originally associated with the HTTP transaction, to the internet user client after forwarding the modified web object; wherein the first advertisement selection service selects targeted advertising web content for presentation to the internet user client based on the at least one user parameter forwarded based on the first monitoring implement included in the modified web object forwarded by the network service provider, and based on at least one user parameter from a monitoring implement included in a modified web object forwarded by another network service provider in response to a separate HTTP transaction.

16. A computer program product as defined in claim 15, wherein the first advertisement selection service is separate from the second advertisement selection service.

17. A computer program product as defined in claim 15, wherein the HTTP transaction involves a web content request that includes search terms directed to an internet search engine, and wherein each monitoring implement causes the internet user client to forward the search terms to each respective advertisement selection service.

18. A computer program product as defined in claim 15, wherein the first and second monitoring implements comprise at least first and second web bugs.

19. A computer program product as defined in claim 18, wherein the first web bug is referenced with a URL having embedded parameters related to the user associated with the internet user client.

20. A computer program product as defined in claim 15, wherein the first and second monitoring implements comprise at least first and second cookies.

21. A computer program product as defined in claim 15, wherein the first monitoring implement comprises a web bug associated with the first advertisement selection service, and the second monitoring implement comprises a cookie associated with the second advertisement selection service.

22. An internet traffic monitoring method, comprising:
a network service provider analyzing an embedded web object request from an internet user client directed to the internet, wherein the internet user client has a connection to the internet through the network service provider;

the network service provider intercepting a requested embedded web object associated with the analyzed request, and customizing the requested embedded web object, wherein the customized web object includes the requested embedded web object which has been modified by the network service provider to include at least a first monitoring implement associated with a first advertisement selection service and to include at least a second monitoring implement associated with a second advertisement selection service; and the network service provider forwarding the customized web object to the internet user client for causing the internet user client to forward at least one user parameter to the first advertisement selection service based on the first monitoring implement and for causing the internet user client to forward at least one user parameter to the second advertisement selection service based on the second monitoring implement;

wherein the first advertisement selection service selects targeted advertising content for presentation to the internet user client based on the at least one user parameter forwarded based on the first monitoring implement, and based on at least one user parameter from a monitoring implement included in a customized web object forwarded by another network service provider in response to a separate embedded web object request.

23. An internet traffic monitoring method as defined in claim 22, wherein the embedded web object request includes search terms directed to an internet search engine, and wherein each monitoring implement causes the internet user client to forward the search terms to each respective advertisement selection service.

24. An internet traffic monitoring method as defined in claim 22, wherein the first and second monitoring implements comprise at least first and second web bugs.

25. An internet traffic monitoring method as defined in claim 24, wherein the first web bug is referenced with a URL having embedded parameters related to the user associated with the internet user client.

26. An internet traffic monitoring method as defined in claim 22, wherein the first and second monitoring implements comprise at least first and second cookies.

27. An internet traffic monitoring method as defined in claim 22, wherein the first monitoring implement comprises a web bug associated with the first advertisement selection service, and the second monitoring implement comprises a cookie associated with the second advertisement selection service.

28. An internet traffic monitoring method as defined in claim 22, wherein the embedded web object request is a request for a javascript object.

29. An internet traffic monitoring method as defined in claim 22, wherein the first advertisement selection service is separate from the second advertisement selection service.

30. A network service provider having an internet traffic monitoring system, comprising:

computer means for analyzing an embedded web object request from an internet user client directed to the internet, wherein the internet user client has a connection to the internet through a network service provider;

computer means for intercepting a requested embedded web object associated with the analyzed request, and customizing the requested embedded web object, wherein the customized web object includes the requested embedded web object which has been modified by the network service provider to include at least a first monitoring implement associated with a first advertisement selection service and to include at least a second monitoring implement associated with a second advertisement selection service; and computer means for forwarding the customized web object to the internet user client for causing the internet user client to forward at least one user parameter to the first advertisement selection service based on the first monitoring implement and for causing the internet user client to forward at least one user parameter to the second advertisement selection service based on the second monitoring implement;

wherein the first advertisement selection service selects targeted advertising content for presentation to the internet user client based on the at least one user parameter forwarded based on the first monitoring implement, and based on at least one user parameter from a monitoring implement included in a customized web object forwarded by another network service provider in response to a separate embedded web object request.

31. A network service provider as defined in claim 30, wherein the first advertisement selection service is separate from the second advertisement selection service.

32. A network service provider as defined in claim 30, wherein the embedded web object request includes search terms directed to an internet search engine, and wherein each monitoring implement causes the internet user client to forward the search terms to each respective advertisement selection service.

33. A network service provider as defined in claim 30, wherein the first and second monitoring implements comprise at least first and second web bugs.

34. An internet traffic monitoring method as defined in claim 33, wherein the first web bug is referenced with a URL having embedded parameters related to the user associated with the internet user client.

35. A network service provider as defined in claim 30, wherein the first and second monitoring implements comprise at least first and second cookies.

36. A network service provider as defined in claim 30, wherein the first monitoring implement comprises a web bug associated with the first advertisement selection service, and the second monitoring implement comprises a cookie associated with the second advertisement selection service.

37. A network service provider as defined in claim 30, wherein the embedded web object request is a request for a javascript object.

38. A computer program product, comprising:

non-transitory computer readable medium including:

code for causing a computer to analyze an embedded web object request from an internet user client directed to the internet, wherein the internet user client has a connection to the internet through a network service provider;

code for causing a computer to intercept a requested embedded web object associated with the analyzed request, and to customize the requested embedded web object, wherein the customized web object includes the requested embedded web object which has been modified by the network service provider to include at least a first monitoring implement associated with a first advertisement selection service and to include at least a second monitoring implement associated with a second advertisement selection service; and code for causing a computer to forward the customized web object to the internet user client for causing the internet user client to forward at least one user parameter to the first advertisement selection service based on the first monitoring implement and for causing the internet user client to forward at least one user parameter to the second advertisement selection service based on the second monitoring implement;

wherein the first advertisement selection service selects targeted advertising content for presentation to the internet user client based on the at least one user parameter forwarded based on the first monitoring implement, and based on at least one user parameter from a monitoring implement included in a customized web object forwarded by another network service provider in response to a separate embedded web object request.

39. A computer program product as defined in claim 38, wherein the first advertisement selection service is separate from the second advertisement selection service.

40. A computer program product as defined in claim 38, wherein the embedded web object request includes search terms directed to an internet search engine, and wherein each monitoring implement causes the internet user client to forward the search terms to each respective advertisement selection service.

41. A computer program product as defined in claim 38, wherein the first and second monitoring implements comprise at least first and second web bugs.

42. A computer program product as defined in claim 41, wherein the first web bug is referenced with a URL having embedded parameters related to the user associated with the internet user client.

43. A computer program product as defined in claim 38, wherein the first and second monitoring implements comprise at least first and second cookies.

44. A computer program product as defined in claim 38, wherein the first monitoring implement comprises a web bug associated with the first advertisement selection service, and the second monitoring implement comprises a cookie associated with the second advertisement selection service.

45. A computer program product as defined in claim 38, wherein the embedded web object request is a request for a javascript object.

* * * * *